United States Patent
Lau et al.

(10) Patent No.: US 10,198,401 B2
(45) Date of Patent: Feb. 5, 2019

(54) MAX POOLING IN A MATRIX PROCESSING ARCHITECTURE

(71) Applicant: Intel Corporation, Santa Clara, CA (US)

(72) Inventors: Horace Lau, Mountain View, CA (US); Tony L. Werner, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 15/395,786

(22) Filed: Dec. 30, 2016

(65) Prior Publication Data

US 2018/0189238 A1 Jul. 5, 2018

(51) Int. Cl.
*G06F 17/16* (2006.01)
*G06N 3/08* (2006.01)

(52) U.S. Cl.
CPC .............. *G06F 17/16* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,721,203 B1 * | 8/2017 | Young | G06N 3/08 |
| 9,886,377 B2 * | 2/2018 | Werner | G06F 12/023 |
| 2015/0278200 A1 * | 10/2015 | He | G06F 17/2785 704/2 |
| 2016/0379352 A1 * | 12/2016 | Zhang | G06T 7/0002 382/157 |
| 2017/0097884 A1 * | 4/2017 | Werner | G06F 12/023 |
| 2017/0185871 A1 * | 6/2017 | Zhang | G06N 3/0454 |
| 2017/0236053 A1 * | 8/2017 | Lavigueur | G06N 3/0454 706/31 |
| 2017/0337468 A1 * | 11/2017 | Bruestle | G06N 3/063 |
| 2018/0189238 A1 * | 7/2018 | Lau | G06N 3/08 |

OTHER PUBLICATIONS

U.S. Appl. No. 15/395,427, filed Dec. 30, 2016, 64 pages.
U.S. Appl. No. 15/395,527, filed Dec. 30, 2016, 76 pages.
U.S. Appl. No. 15/395,542, filed Dec. 30, 2016, 64 pages.
U.S. Appl. No. 15/395,654, filed Dec. 30, 2016, 61 pages.
U.S. Appl. No. 15/395,675, filed Dec. 30, 2016, 88 pages.
U.S. Appl. No. 15/395,906, filed Dec. 30, 2016, 68 pages.

* cited by examiner

*Primary Examiner* — David H Malzahn
(74) *Attorney, Agent, or Firm* — Alliance IP, LLC

(57) ABSTRACT

In one embodiment, an apparatus comprises a multi-dimensional memory and a plurality of processing elements to perform a matrix operation, wherein the matrix operation comprises a max pooling operation on one or more matrix operands. The plurality of processing elements comprises one or more matrix processors, and the plurality of processing elements is configured to: receive matrix data from the multi-dimensional memory, wherein the matrix data is associated with the one or more matrix operands; extract the one or more matrix operands from the matrix data; perform the max pooling operation using the one or more matrix operands; and obtain a result of the max pooling operation.

18 Claims, 9 Drawing Sheets

MAX POOLING IN A MATRIX PROCESSING ARCHITECTURE

FIELD OF THE SPECIFICATION

This disclosure relates in general to the field of computer processing, and more particularly, though not exclusively, to matrix processing.

BACKGROUND

Matrix operations, such as matrix multiplication and convolutions, can be highly processor-intensive and memory-intensive operations, as they often involve complex operations on large, multi-dimensional matrix operands. Accordingly, the performance of complex matrix operations can be limited by the processing and/or memory latency. As matrix operations are increasingly utilized in a variety of applications and with ever-growing data sets (from graphics and image processing to machine learning and artificial intelligence), the demand for high-performance and flexible processing of matrix operations is increasing.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
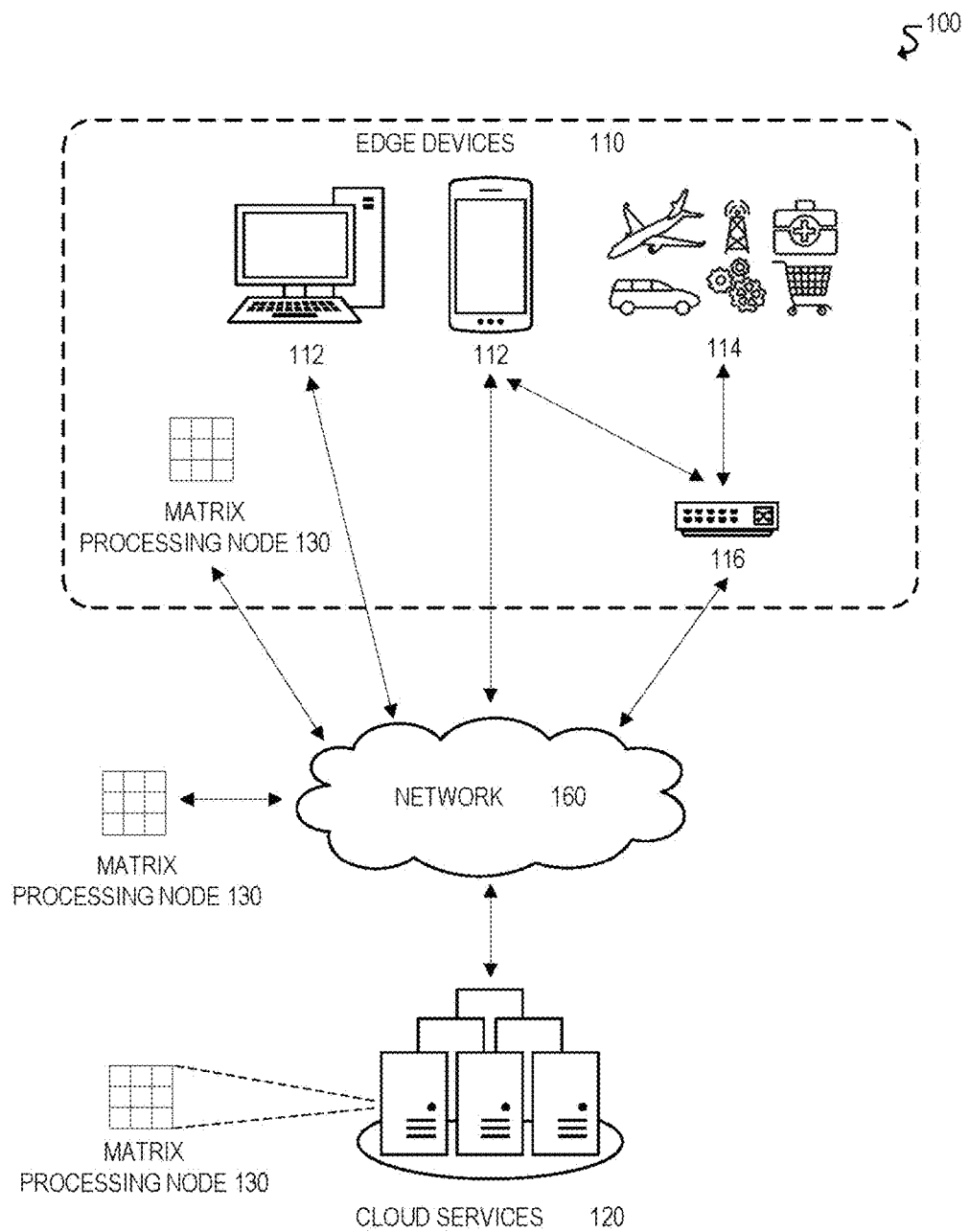
FIG. 1 illustrates a schematic diagram for an example computing system according to certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Matrix processing operations (e.g., linear algebra operations that involve matrix and/or vector operands) have a wide range of applications in computing systems, from graphics processing to machine learning and artificial intelligence, among other examples. For example, complex matrix operations may be used to implement artificial neural networks that provide artificial intelligence and machine learning capabilities, including computer vision, autonomous navigation, speech and audio recognition, and natural language processing, among other examples. These complex matrix operations (e.g., matrix multiplication and convolutions) may be used to implement the fundamental operations of neural networks, such as forward propagation, backward propagation, and weight updates. These matrix operations, however, can be highly processor and memory intensive, as they often involve complex operations on large, multi-dimensional matrix operands. Accordingly, the performance of these matrix operations can be limited by processing and/or memory latency. As matrix operations are increasingly utilized in a variety of applications with ever-growing data sets, such as artificial intelligence and machine learning, the demand for high-performance processing of matrix operations is increasing.

Existing matrix processing approaches suffer from various inefficiencies, particularly when used to implement artificial intelligence and machine learning in artificial neural networks. For example, while central processing units (CPUs) could be used to perform matrix operations, many CPU architectures are designed for low arithmetic intensity operations (i.e., a low ratio of arithmetic operations relative to memory operations), and thus are not designed for efficient execution of matrix operations. Moreover, many CPU architectures utilize complex local or cache memory management routines, which may increase processing overhead and execution complexity for operations involving large matrix operands. Graphics processing units (GPUs) could also be used to perform matrix operations. GPUs, however, are often designed for high precision computations and may provide a level of precision that is unnecessary for certain matrix operations, thus reducing the volume of matrix operations that can be performed. Accordingly, existing matrix processing approaches are inefficient for certain matrix operations, such as convolution related operations in an artificial neural network.

The matrix processing functionality described throughout this disclosure provides an efficient hardware-based approach for performing max pooling in an artificial neural network. An artificial neural network, for example, includes a series of connected layers. Moreover, in some cases, the neural network may include one or more max pooling layers. Max pooling is a down-sampling operation that reduces the spatial size of an input feature map, for example, to reduce the amount of parameters and computation in the neural network. A max pooling layer, for example, is often inserted between successive convolutional layers in a convolutional neural network. Max pooling is performed by sliding a "max filter" throughout the input feature map, identifying the maximum value within each filter position on the input feature map, and storing the respective maximum values in an output feature matrix. Forward propagation through the max pooling layer of a neural network may be referred to as forward pooling, while backward propagation through the max pooling layer of a neural network may be referred to as backward pooling.

Backward pooling is used to partially reconstruct the original input feature map, for example, using the max values and indices from the forward pooling operation. Each max value-index pair can be processed sequentially to reconstruct a partial facsimile of the original input feature map. The reconstructed feature map, of course, will only retain the respective maximum values from the various original filter positions, while all other elements will be filled with zeroes.

During backward pooling, if each max value-index pair is fully processed and written to memory in isolation, that would require multiple duplicative read and write operations when reconstructing the original feature map, due to the overlapping elements in the respective filter positions. Accordingly, in order to efficiently reconstruct the original feature map, it is critical to determine when you have processed all value-index pairs that can impact a particular element of the reconstructed feature map, so that the particular element can be written to memory at an appropriate time to minimize the number of total memory accesses. For example, given that the filter movement is to the right and then down, the element in the top-left corner of the filter is always the latest element that will have no further updates. Accordingly, that element can be safely written to memory. The present disclosure describes various embodiments for efficiently implementing backward pooling in this manner.

Example embodiments that may be used to implement the matrix processing functionality of this disclosure will now be described with more particular reference to the attached FIGURES.

FIG. 1 illustrates a schematic diagram for an example computing system 100 according to certain embodiments.

In some embodiments, the matrix processing functionality described throughout this disclosure may be implemented in system 100. Matrix processing functionality may be used in system 100 for a wide range of applications and/or use cases involving matrix operations, from graphics processing to machine learning and artificial intelligence, among other examples. For example, in some embodiments, matrix processing functionality may be used to implement artificial intelligence and machine learning in artificial neural networks. Moreover, matrix processing functionality may be implemented by any component of system 100. For example, in the illustrated embodiment, system 100 includes edge devices 110, cloud services 120, matrix processing nodes 130, and network 150. Matrix processing nodes 130 may include any component or device with matrix processing functionality, including any component of system 100. For example, matrix processing nodes 130 may include cloud services 120 and/or servers implemented with matrix processing functionality (e.g., application servers in a datacenter), edge devices 110 implemented with matrix processing functionality (e.g., end-user devices 112, Internet-of-Things devices 114, gateways 116), and so forth. These various components of system 100 are discussed further below.

Edge devices 110 may include any equipment and/or devices deployed or connected near the "edge" of a communication system 100. Edge devices 110 may communicate with each other and/or with other remote networks and services (e.g., cloud services 120) through one or more networks and/or communication protocols, such as network 150. In some embodiments, certain edge devices 110 may include the matrix processing functionality described throughout this disclosure, and thus may be used as matrix processing nodes 130. In the illustrated embodiment, edge devices 110 include end-user devices 112 (e.g., desktops, laptops, mobile devices), Internet-of-Things (IoT) devices 114, and gateways and/or routers 116, among other examples.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. In some embodiments, certain cloud services 120 may include the matrix processing functionality described throughout this disclosure, and thus may be used as matrix processing nodes 130.

In general, edge devices 110 (and in particular IoT devices 114) may generate an extremely large volume and variety of data. IoT edge devices 114 typically offload this data to the cloud for processing and/or storage (e.g., by cloud services 120). Cloud services 120, however, may not necessarily be suited to handle the rapidly growing volume, variety, and velocity of data generated by IoT devices 114 and other edge devices 110. For example, cloud-based processing may not be ideal in certain circumstances, such as processing time-sensitive or highly confidential data, or when faced with network bandwidth constraints, among other examples. In some embodiments, cloud services 120 may leverage "edge" based processing using edge devices 110 to improve the performance of cloud services. Edge processing is an approach that involves processing certain data at the network edge (e.g., using edge devices 110), near where the data is generated, rather than simply funneling large volumes of data to the cloud for processing and storage. Certain data may still be sent to the cloud, as appropriate, such as for deeper analysis and/or long-term storage. Edge processing may be used to complement the shortcomings of cloud-based processing (e.g., when cloud-based processing is inefficient, ineffective, and/or unsecure), and thus improve the handling of the growing volume, variety, and velocity of data generated by IoT devices 114 and/or other edge devices 110. For example, in some cases, processing data near its source (e.g., in the network edge) rather than in the cloud may improve performance and/or avoid system failures or disasters. Edge processing may also conserve network bandwidth, which may be particularly beneficial when facing bandwidth constraints and/or limited network connectivity.

In some embodiments, edge devices 110 that provide edge-based processing for cloud services 120 may be collectively referred to as the "fog," as they serve to extend the "cloud" to the edge of the network, thus creating a "fog" over the network edge. In some embodiments, devices 110 in the "fog" may connect and/or communicate with each other, for example, using an interconnection standard or protocol. For example, in some embodiments, device interconnection may be implemented using the open interconnect consortium (OIC) standard specification 1.0, released by the Open Connectivity Foundation™ (OCF) on Dec. 23, 2015, which enables devices to discover and connect with each other. Another interconnection protocol that may be used is Thread, a networking protocol for Internet-of-Things (IoT) devices used in "smart" home automation and similar deployments, which has been developed by an alliance of organizations named the "Thread Group." Other interconnection protocols may also be used, including, for example, the optimized link state routing (OLSR) protocol, or the better approach to mobile ad-hoc networking (B.A.T.M.A.N.), among others.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Example Matrix Processing Architecture

Figure 2A:
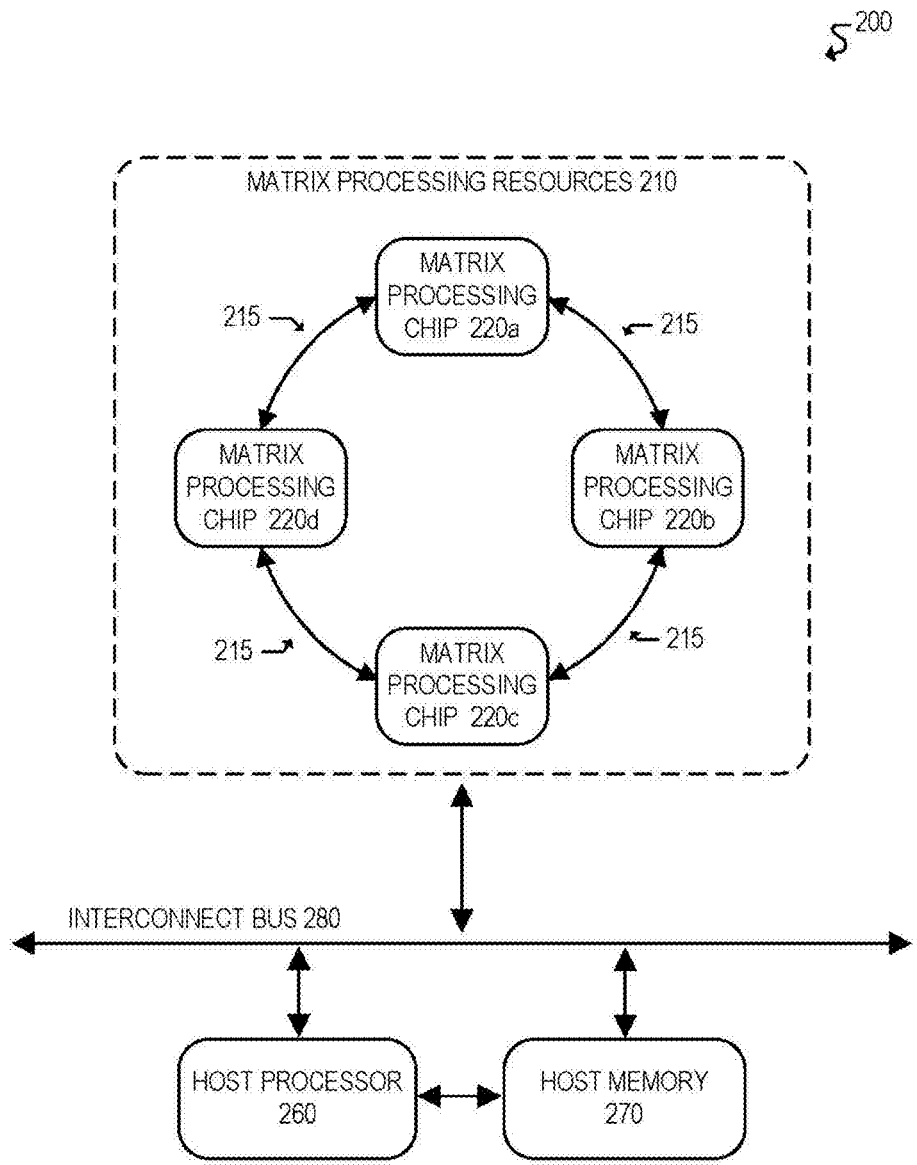
FIGS. 2A-C illustrate block diagrams for an example embodiment of a matrix processing architecture.
Figure 2B:
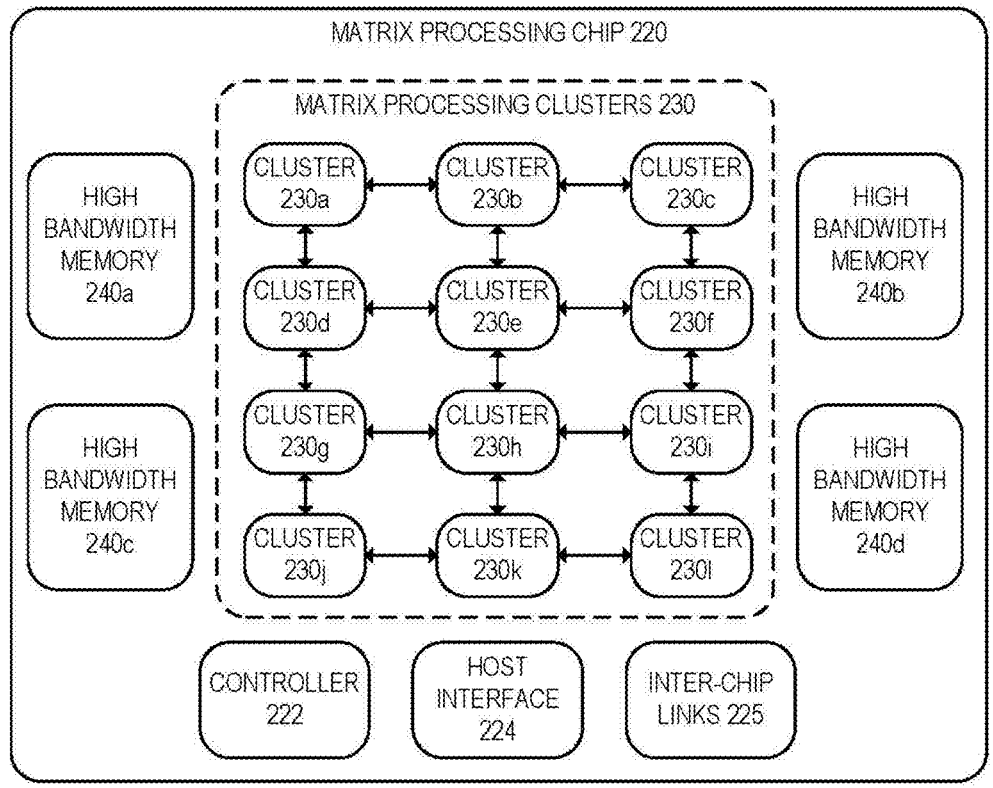
Figure 2C:
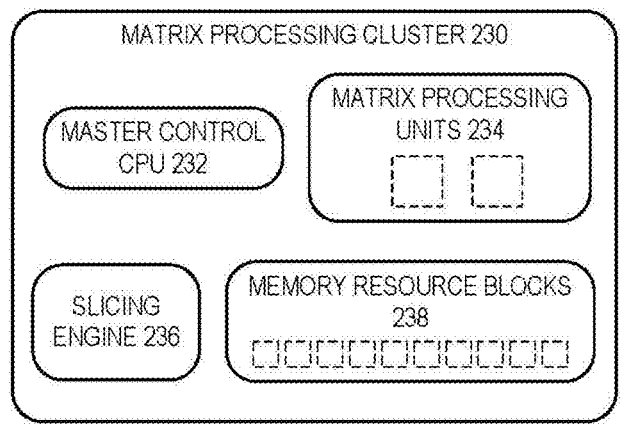

FIGS. 2A-C illustrate block diagrams for an example embodiment of a matrix processing architecture.

In some embodiments, the matrix processing functionality described throughout this disclosure may be implemented using a matrix processing architecture, such as the matrix processing architecture of FIGS. 2A-2C. Matrix processing architectures, such as the matrix processing architecture of FIGS. 2A-2C, may be implemented or used in a variety of systems, devices, and/or components, such as those described throughout this disclosure, including system 100 of FIG. 1 and/or any of its associated components (e.g., cloud services 120/datacenter servers, edge devices 110, matrix processing nodes 130). In some embodiments, the matrix processing architecture of FIGS. 2A-2C may be used to implement artificial intelligence and machine learning in neural networks. The matrix processing architecture illustrated in FIGS. 2A-2C is merely one example embodiment for performing the matrix processing functionality described throughout this disclosure. Other embodiments may use different types, arrangements, and/or numbers of components. For example, other embodiments may include any number of matrix processing chips 220, matrix processing clusters 230, matrix processing units (MPUs) 234, high bandwidth memory (HBM) modules 240, and/or memory resource blocks (MRBs) 238. Moreover, all or part of any component of the matrix processing architecture of FIGS. 2A-2C (e.g., any component of matrix processing system 200, matrix processing chips 220, and/or matrix processing clusters 230) may be implemented as a separate or stand-alone component or chip, or may be integrated with other components or chips, such as a system-on-a-chip (SoC) that integrates various computer components into a single chip.

FIG. 2A illustrates a block diagram for an example embodiment of a matrix processing system 200. In the illustrated embodiment, matrix processing system 200 includes host processor 260, host memory 270, matrix processing resources 210, and interconnect bus 280.

Host processor 260 may be configured to control and/or manage matrix processing system 200. For example, in some embodiments, host processor 260 may use matrix processing resources 210 to perform complex matrix operations. Host processor 260 may be any processing resource capable of controlling and/or managing matrix processing functionality of matrix processing system 200. For example, in some embodiments, host processor 260 may be implemented using computer processors 300 or 400 of FIGS. 3 and 4, respectively. In some embodiments, host processor 260 may be a separate or stand-alone component that is communicatively coupled to matrix processing resources 210. Alternatively, in other embodiments, host processor 260 and matrix processing resources 210 may be integrated into the same component or chip. For example, in some embodiments, the components of matrix processing system 200, including host processor 260 and matrix processing resources 210, may be implemented as a system-on-a-chip (SoC).

Host memory 270 may include any type or combination of volatile and/or non-volatile memory. Examples of volatile memory include various types of random access memory (RAM), such as dynamic random access memory (DRAM), synchronous dynamic random access memory (SDRAM), and static random access memory (SRAM), among other examples. Examples of non-volatile memory include disk-based storage mediums (e.g., magnetic and/or optical storage mediums), solid-state storage (e.g., any form of persistent flash memory, including planar or three dimensional (3D) NAND flash memory or NOR flash memory), 3D crosspoint memory, electrically erasable programmable read-only memory (EEPROM), and/or other types of non-volatile random access memories (RAM), among other examples. Host memory 270 may be used, for example, to store information for host processor 260 during execution, such as code and/or data.

Interconnect bus 280 may be used, in some embodiments, to communicatively couple host processor 260 and host memory 270 to matrix processing resources 210. Interconnect bus 280 may use any interconnection protocol, such as Peripheral Component Interconnect express (PCIe), Universal Serial Bus (USB), or Small Computer Systems Interface (SCSI), among other examples.

Matrix processing resources 210 may include any processing resources configured to perform matrix operations. For example, matrix processing resources 210 may be configured to perform matrix multiplication operations, convolution operations, element-wise matrix operations (e.g., +, *, /<, >, ==), dimension shuffle operations, and/or any combination thereof. In some embodiments, matrix processing resources 210 may include processing resources that are designed and optimized for performing matrix operations. In some embodiments, matrix processing resources 210 may also be arranged hierarchically with multiple levels of processing resources. For example, in the illustrated embodiment, matrix processing resources 210 include a plurality of matrix processing chips 220, and may also include any processing resources within each matrix processing chip 220. For example, as discussed below in connection with FIGS. 2B and 2C, each matrix processing chip 220 may include a plurality of high bandwidth memory (HBM) modules 240 and a plurality of matrix processing clusters 230, and each matrix processing cluster 230 may include multiple matrix processing units 234. Thus, in some embodiments, matrix processing resources 210 may include multiple matrix processing chips 220, multiple high bandwidth memory (HBM) modules 240 and multiple matrix processing clusters 230 on each matrix processing chip 220, and/or multiple matrix processing units 234 on each matrix processing cluster 230.

Matrix processing chips 220 may be, for example, any chips or other components configured to perform matrix operations. For example, in some embodiments, a matrix processing chip 220 may be a peripheral card or chip connected to host processor 260 using any type of interconnect interface, such as a PCIe interface. In some embodiments, a matrix processing chip 220 may be implemented using an integrated circuit, such as an application specific integrated circuit (ASIC), a field programmable gate array (FPGA), and/or any other type of circuitry. In the illustrated embodiment, matrix processing chips 220 are configured in a cyclical arrangement, with communication channels 215 between neighboring matrix processing chips 220. In some embodiments, communication channels 215 may provide one-way communication between neighboring matrix processing chips 220. In other embodiments, however, communication channels 215 may provide bi-directional communication between neighboring matrix processing chips 220. A cyclical arrangement with one-way communication between neighboring processing resources may be referred to as a "single-cyclical" configuration, while a cyclical arrangement with bi-directional communication between neighboring processing resources may be referred to as a "dual-cyclical" configuration.

Moreover, although not illustrated, in some embodiments matrix processing system 200 may include a communication interface to communicate over a communication network. For example, in some embodiments, matrix processing system 200 may communicate over a network with one or more remote matrix processing chips to perform distributed matrix operations.

FIG. 2B illustrates a block diagram for an example embodiment of a matrix processing chip 220. In the illustrated embodiment, matrix processing chip 220 includes controller 222, host interface 224, inter-chip links 225, high bandwidth memory (HBM) modules 240, and matrix processing clusters 230.

Controller 222 may be configured to control and/or manage matrix operations performed by matrix processing chip 220. In some embodiments, controller 222 may control and/or manage matrix operations in conjunction with host processor 260 of FIG. 2A and/or master control CPUs (MCCs) 232 of matrix processing clusters 230 of FIG. 2C. For example, in some embodiments, host processor 260, controller 222, and/or master control CPUs (MCCs) 232 may be configured to receive a matrix operation or command, and distribute the matrix operation and matrix operands across matrix processing clusters 230 and high bandwidth memory (HBM) modules 240. In some embodiments, controller 222 may be a microprocessor, an integrated circuit, and/or any other type of circuitry and/or processing logic.

Host interface 224 may be a communication interface that enables a matrix processing chip 220 to communicate with host processor 260 of FIG. 2A. In some embodiments, for example, controller 222 may use host interface 224 to communicate with host processor 260 of FIG. 2A. Host interface 224 may use any type of interconnect protocol or interface, including Peripheral Component Interconnect express (PCIe), Universal Serial Bus (USB), or Small Computer Systems Interface (SCSI), among other examples.

Inter-chip links (ICLs) 225 may enable a matrix processing chip 220 to communicate with other matrix processing chips. For example, inter-chip links 225 may be used to implement the communication channels 215 between matrix processing chips 220 in FIG. 2A. An inter-chip link 225 may be, for example, any communication interface that enables a matrix processing chip 220 to communicate with another matrix processing chip. In some embodiments, a matrix processing chip 220 may include multiple inter-chip links 225 (e.g., twelve inter-chip links). In some embodiments, an inter-chip link 225 may be implemented using one or more serializer/de-serializer (SerDes) interfaces. A SerDes interface may be a communication interface that converts data from serial to parallel, and vice-versa. For example, the transmitter of a SerDes interface may include a serial-to-parallel converter, and the receiver of a SerDes interface may include a parallel-to-serial converter. In some embodiments, a matrix processing chip 220 may use multiple SerDes interfaces for each connection to another matrix processing chip (e.g., four SerDes interfaces between each pair of connected matrix processing chips).

High bandwidth memory (HBM) modules 240 may be memory components associated with matrix processing chip 220 that are used to store matrix operands and other matrix data. In some embodiments, high bandwidth memory (HBM) modules 240 may be designed to efficiently store and retrieve matrix data. In some embodiments, high bandwidth memory (HBM) modules 240 may be multi-dimensional memory components configured to store and retrieve data in multiple dimensions. For example, in some embodiments, high bandwidth memory (HBM) modules 240 may be memory components configured to store and retrieve data in two dimensions, such as rows and columns. Other embodiments, however, may use memory components configured to store and retrieve data using any other number of dimensions (e.g., one dimension, three dimensions, four dimensions, and so forth). In the illustrated embodiment, matrix processing chip 220 includes four high bandwidth memory (HBM) modules 240a-d. In some embodiments, high bandwidth memory (HBM) modules 240 may be shared by the matrix processing clusters 230 of a matrix processing chip 220.

Matrix processing clusters 230 may include processing resources configured to perform matrix operations, such as matrix multiplication, convolutions, and/or dimension shuffling, among other examples. In some embodiments, matrix processing clusters 230 may be collectively used to execute a particular matrix operation by performing matrix processing in parallel. In the illustrated embodiment, matrix processing chip 220 includes twelve matrix processing clusters 230a-l. Moreover, in the illustrated embodiment, matrix processing clusters 230 are configured or arranged using a two-dimensional mesh interconnection topology. The interconnection topology of matrix processing clusters 230 may facilitate cyclical communication among the matrix processing clusters 230. Moreover, other embodiments may include any number and/or arrangement of matrix processing clusters 230.

FIG. 2C illustrates a block diagram for an example embodiment of a matrix processing cluster 230. In the illustrated embodiment, matrix processing cluster 230 includes master control CPU (MCC) 232, matrix processing units (MPUs) 234, slicing engine 236, and memory resource blocks (MRBs) 238.

Master control CPU (MCC) 232 may be configured to control and/or manage matrix operations performed by a matrix processing cluster 230. In some embodiments, master control CPU 232 may be a microprocessor, an integrated circuit, and/or any other type of circuitry and/or processing logic. In some embodiments, master control CPU 232 may receive instructions from another component, such as host processor 260 of FIG. 2A and/or controller 222 of FIG. 2B. Based on the instructions, master control CPU 232 may then use matrix processing units 234 to perform matrix operations, such as matrix multiplication, convolutions, and/or dimension shuffling, among other examples. For example, master control CPU 232 may receive an instruction to perform a matrix multiplication operation, such as C=A*B. The instruction may include the handles or identifiers for each matrix, and may also indicate how the matrices should be stored in memory resource blocks (MRBs) 238. Matrices A and B may then be broken down into a series of smaller matrices (e.g., 32×32 matrices). Matrix operations may then be performed on the smaller matrices, and the partial results may be stored in memory resource blocks (MRBs) 238, until the output matrix C has been fully computed.

Matrix processing units (MPUs) 234 may be configured to perform matrix operations, such as matrix multiplication, convolutions, and/or dimension shuffling. In some embodiments, matrix processing units (MPUs) 234 perform matrix operations based on commands received from master control CPU (MCC) 232. Moreover, in some embodiments, each matrix processing cluster 230 may include multiple matrix processing units (MPUs) 234. For example, in the illustrated embodiment, matrix processing cluster 230 includes two matrix processing units (MPUs) 234. A matrix processing unit (MPU) 234 may be capable of performing matrix operations, such as matrix multiplication, on small matrices (e.g., 32×32 matrices). In some cases, a matrix processing unit (MPU) 234 may be designed and/or optimized to perform matrix multiplication operations. A matrix processing unit (MPU) 234 may load matrix operands from memory resource blocks (MRBs) 238. In some embodiments, a matrix processing unit (MPU) 234 may support the following arithmetic operations: matrix multiplication; unary matrix operations; binary matrix operations, such as addition (+), subtraction (−), multiplication (*), division (/), bitwise XOR, AND, OR, logical and arithmetic left and right shift, comparison (>, <, >=, <=, ==, !=); and column-wise, row-wise, and matrix-wide operations, such as sum, max value, and min value.

Slicing engine 236 may be configured to slice the matrix operands of a particular matrix operation into smaller partial matrices. For example, in some embodiments, master control CPU (MCC) 232 may use slicing engine 236 to break up matrix operands into smaller partial matrices for matrix processing units (MPUs) 234. In some embodiments, slicing engine 236 may include a convolution slicing engine (CSE) to perform matrix slicing for convolution operations. For example, in some embodiments, a convolution slicing engine (CSE) may slice matrix operands in a manner that enables a convolution operation to be cast as a matrix multiplication operation, thus enabling the same processing logic to perform both matrix multiplication and convolution operations. Moreover, in some embodiments, slicing engine 236 and/or the associated convolution slicing engine (CSE) may be used to perform the dimension shuffle operations to reorder the dimensions of a matrix.

Memory resource blocks (MRBs) 238 may be memory components on matrix processing cluster 230 used to store matrix operands and other matrix data. In some embodiments, memory resource blocks (MRBs) 238 may be designed to store and retrieve matrix data efficiently. In some embodiments, memory resource blocks (MRBs) 238 may be multi-dimensional memory components configured to store and retrieve data in multiple dimensions. For example, in some embodiments, memory resource blocks (MRBs) 238 may be memory components configured to store and retrieve data in two dimensions, such as rows and columns. In the illustrated embodiment, matrix processing cluster 230 includes ten memory resource blocks (MRBs) 238. Other embodiments, however, may include a different number of memory resource blocks (MRBs) 238 on a matrix processing cluster 230. In some embodiments, each memory resource block (MRB) 238 may be capable of storing a matrix of a certain size (e.g., a 256×512 matrix). In some embodiments, memory resource blocks (MRBs) 238 may be shared by the matrix processing units (MPUs) 234 of a particular matrix processing cluster 230.

In some embodiments, the matrix processing architecture of FIGS. 2A-2C may be used to implement the matrix processing functionality described throughout this disclosure. For example, matrix processing system 200 may be used to perform matrix operations using a distributed approach that achieves 100% processing efficiency using the available processing resources. For example, in some embodiments, a matrix operation may be distributed across multiple processing resources 210 that are optimized for matrix processing, thus enabling full utilization of the processing resources 210 throughout the duration of the matrix operation. For example, matrix processing system 200 may include multiple processing resources 210 that are designed and optimized for performing matrix operations. In some embodiments, these processing resources 210 may be configured in a single-cyclical or dual-cyclical arrangement. In addition, the processing resources 210 may be arranged hierarchically with multiple levels of processing resources. For example, in some embodiments, the processing resources 210 may include multiple matrix processing chips 220, multiple high bandwidth memory (HBM) modules 240 and multiple matrix processing clusters 230 on each matrix processing chip 220, and/or multiple matrix processing units (MPUs) 234 on each matrix processing cluster 230. This processing architecture enables matrix operations to be distributed across multiple processing resources 210 and/or processing hierarchies with 100% processing efficiency. In addition, this processing architecture enables matrix operations to be efficiently scaled across a variable number of processing resources 210 operating in parallel, while still achieving 100% processing efficiency. For example, scaling may be achieved by adjusting the number of processing resources 210 used to perform a particular matrix operation, such as the number of matrix processing systems 200 or servers, the number of matrix processing chips 220 in each matrix processing system 200 or server, and so forth.

As an example, the matrix processing architecture of FIGS. 2A-2C may be used to implement matrix multiplication and/or convolution operations. For example, in some embodiments, a matrix multiplication operation may be distributed across multiple processing resources 210 in a manner that results in the latency for communicating matrix operands being less than the matrix processing time, which allows the communication of matrix operands to be completed while the matrix processing is being performed. For example, for certain matrix operations involving matrix operands with certain dimensions (e.g., matrix multiplication with a "thin" matrix operand), the time required to access and communicate matrix operands may exceed the time required to perform the actual matrix computations, resulting in idle processing time while the matrix operands are being obtained from memory and/or communicated to processing resources 210. For example, a single-cyclical configuration (e.g., where each processing resource 210 only obtains matrix operands and data from one neighboring processing resource 210 at any given time) may be unable to achieve 100% processing efficiency for these particular types of matrix operations and matrix operands. However, a dual-cyclical configuration of processing resources 210 enables each processing resource to perform matrix computations while simultaneously obtaining matrix operands and data from both of its neighboring processing resources 210, which significantly reduces the latency for communicating matrix operands, and thus avoids any idle processing time.

For example, the communication latency for certain operations may be reduced by half when using a dual-cyclical approach as opposed to a single-cyclical approach. In this manner, the latency for communicating matrix operands and matrix data can be fully masked by the matrix processing time, thus avoiding any wasted or idle processing time and achieving 100% processing efficiency. Accordingly, matrix operations (e.g., matrix multiplication or GEMM) can be performed efficiently even for large matrix operands and/or matrix operands with certain dimensions, such as a large matrix operand that is neither square nor a single vector (e.g., a "thin" matrix with a much larger height than width). For example, matrix multiplication can be performed efficiently even when multiplying two thin matrices, a thin matrix and a square matrix, and so forth. Similarly, convolution operations may be distributed across multiple processing resources 210 in a manner that results in 100% processing efficiency using the available processing resources.

As an example, when a matrix operation or command is received, the matrix operation may be distributed across the processing resources 210 of matrix processing system 200. For example, the matrix operands (or input matrices) may be partitioned based on the number of available processing resources 210. Moreover, in some embodiments, the partitions may be across the rows of the matrix operands, and/or across any other dimension of the matrix operands. Each partition may then be distributed to a particular processing resource 210. Each processing resource 210 may then perform a plurality of partial matrix operations. In some embodiments, the plurality of partial matrix operations is performed in a plurality of stages. For example, each processing resource 210 may perform a particular stage of partial matrix operations while simultaneously sending and receiving partial matrix data to and from its neighboring processing resources 210. For example, in a single-cyclical configuration of processing resources 210, each processing resource 210 either sends or receives partial matrix data to or from each neighbor processing resource. Similarly, in a dual-cyclical configuration of processing resources 210, each processing resource 210 may send and receive partial matrix data to and from each neighboring processing resource 210.

Each processing resource 210 may then use the partial matrix data for subsequent partial matrix operations. The result of the matrix operation may then be determined based on the partial matrix operations collectively performed by the processing resources 210.

Moreover, if the processing resources 210 are arranged hierarchically, the matrix operation may be distributed in a hierarchical manner. For example, the matrix operands (or input matrices) may initially be partitioned based on the number of available matrix processing chips 220. Each partition, and the associated partial matrix operations, may then be distributed to a particular matrix processing chip 220. The partition and partial matrix operations distributed to a particular matrix processing chip 220 may then be similarly partitioned and distributed across the matrix processing clusters 230 and/or high bandwidth memory (HBM) modules 240 of the particular matrix processing chip 220. For example, for certain matrix operations, partial matrix operations may be distributed to each matrix processing cluster 230. Alternatively, for certain matrix operations, partial matrix operations may be distributed across various "logical processing nodes" (e.g., groups of matrix processing clusters 230 associated with a high-bandwidth memory (HBM) module 240), and may then be distributed to each matrix processing cluster 230 of a particular logical processing node. In some embodiments, the matrix processing clusters 230 (and/or the logical processing nodes) may be cyclically configured similar to the matrix processing chips 220. The partition and partial matrix operations distributed to a particular matrix processing cluster 230 may then be similarly partitioned and distributed across the matrix processing units (MPUs) 234 of the particular matrix processing cluster 230.

Example Computer Processor Architectures

Figure 3:
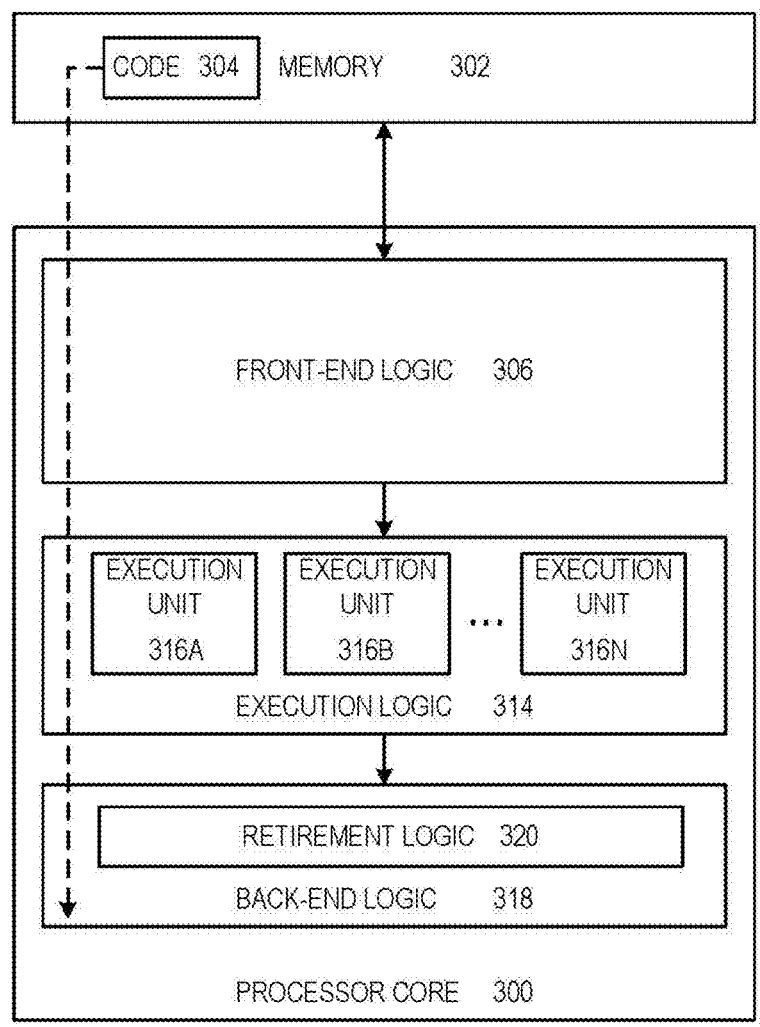
FIGS. 3 and 4 illustrate block diagrams for example embodiments of computer processors.
Figure 4:
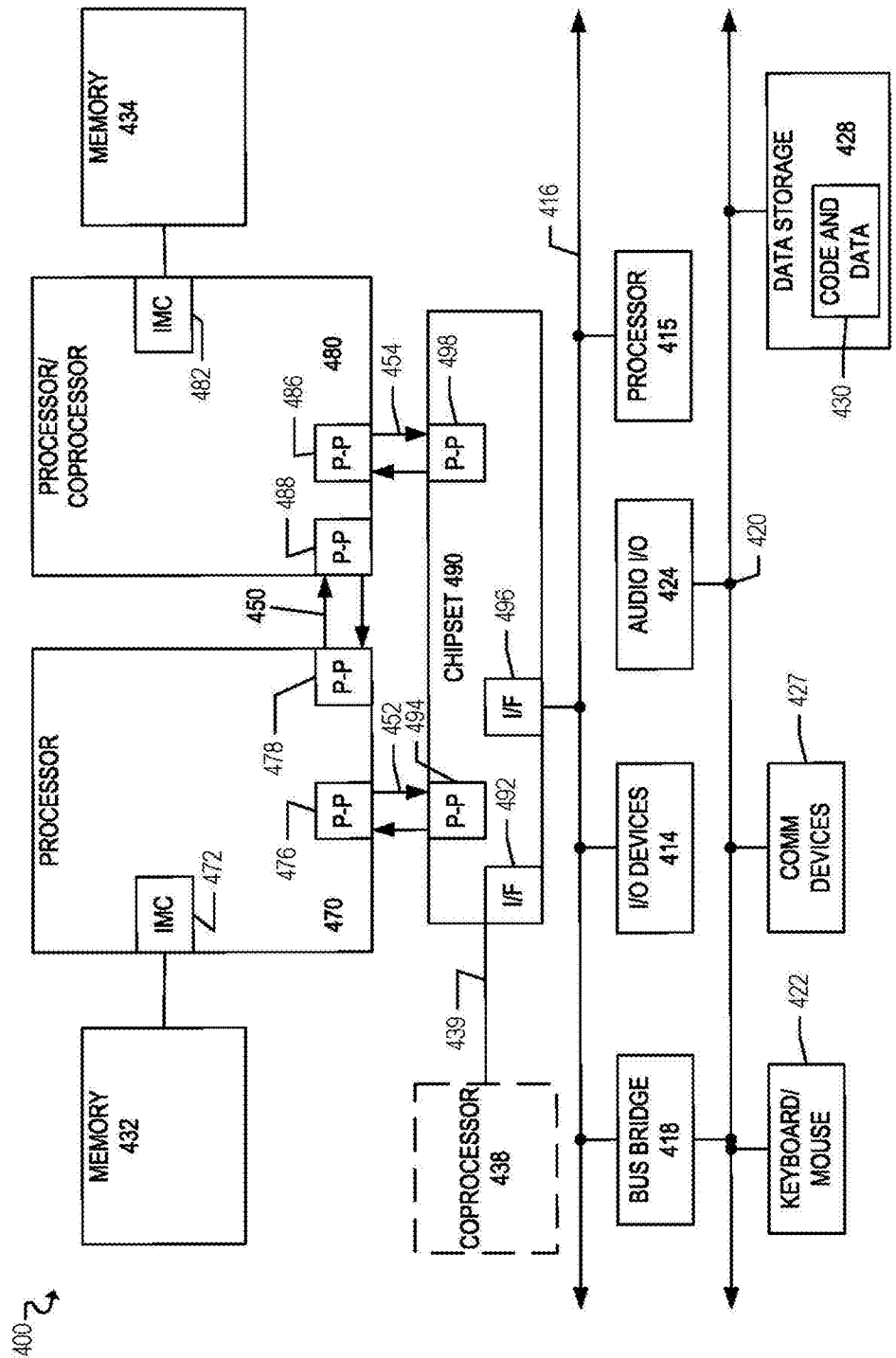

FIGS. 3 and 4 illustrate block diagrams for example embodiments of computer processors that may be used in accordance with embodiments disclosed herein. For example, the computer processors illustrated in FIGS. 3 and 4 may be used as host processors associated with matrix processing systems (e.g., host processor 260 in matrix processing system 200 of FIG. 2A), or as processors associated with other components and/or devices discussed throughout this disclosure (e.g., processors associated with components in system 100 of FIG. 1). Other processor and system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 3 illustrates a block diagram for an example embodiment of a processor 300. Processor 300 is an example of a type of hardware device that can be used in connection with the embodiments described throughout this disclosure. Processor 300 may be any type of processor, such as a microprocessor, an embedded processor, a digital signal processor (DSP), a network processor, a multi-core processor, a single core processor, or other device to execute code. Although only one processor 300 is illustrated in FIG. 3, a processing element may alternatively include more than one of processor 300 illustrated in FIG. 3. Processor 300 may be a single-threaded core or, for at least one embodiment, the processor 300 may be multi-threaded in that it may include more than one hardware thread context (or "logical processor") per core.

FIG. 3 also illustrates a memory 302 coupled to processor 300 in accordance with an embodiment. Memory 302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 300 can execute any type of instructions associated with algorithms, processes, or operations detailed herein. Generally, processor 300 can transform an element or an article (e.g., data) from one state or thing to another state or thing.

Code 304, which may be one or more instructions to be executed by processor 300, may be stored in memory 302, or may be stored in software, hardware, firmware, or any suitable combination thereof, or in any other internal or external component, device, element, or object where appropriate and based on particular needs. In one example, processor 300 can follow a program sequence of instructions indicated by code 304. Each instruction enters a front-end logic 306 and is processed by one or more decoders 308. The decoder may generate, as its output, a micro operation such as a fixed width micro operation in a predefined format, or may generate other instructions, microinstructions, or control signals that reflect the original code instruction. Front-end logic 306 may also include register renaming logic and scheduling logic, which generally allocate resources and queue the operation corresponding to the instruction for execution.

Processor 300 can also include execution logic 314 having a set of execution units 316a, 316b, 316n, etc. Some embodiments may include a number of execution units dedicated to specific functions or sets of functions. Other embodiments may include only one execution unit or one execution unit that can perform a particular function. Execution logic 314 performs the operations specified by code instructions.

After completion of execution of the operations specified by the code instructions, back-end logic 318 can retire the instructions of code 304. In one embodiment, processor 300 allows out of order execution but requires in order retirement of instructions. Retirement logic 320 may take a variety of known forms (e.g., re-order buffers or the like). In this manner, processor 300 is transformed during execution of code 304, at least in terms of the output generated by the decoder, hardware registers and tables utilized by register renaming logic 310, and any registers (not shown) modified by execution logic 314.

Although not shown in FIG. 3, a processing element may include other elements on a chip with processor 300. For example, a processing element may include memory control logic along with processor 300. The processing element may include I/O control logic and/or may include I/O control logic integrated with memory control logic. The processing element may also include one or more caches. In some embodiments, non-volatile memory (such as flash memory or fuses) may also be included on the chip with processor 300.

FIG. 4 illustrates a block diagram for an example embodiment of a multiprocessor 400. As shown in FIG. 4, multiprocessor system 400 is a point-to-point interconnect system, and includes a first processor 470 and a second processor 480 coupled via a point-to-point interconnect 450. In some embodiments, each of processors 470 and 480 may be some version of processor 300 of FIG. 3.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of this disclosure is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

All or part of any component of FIG. 4 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Matrix Processing Engine

Figure 5:
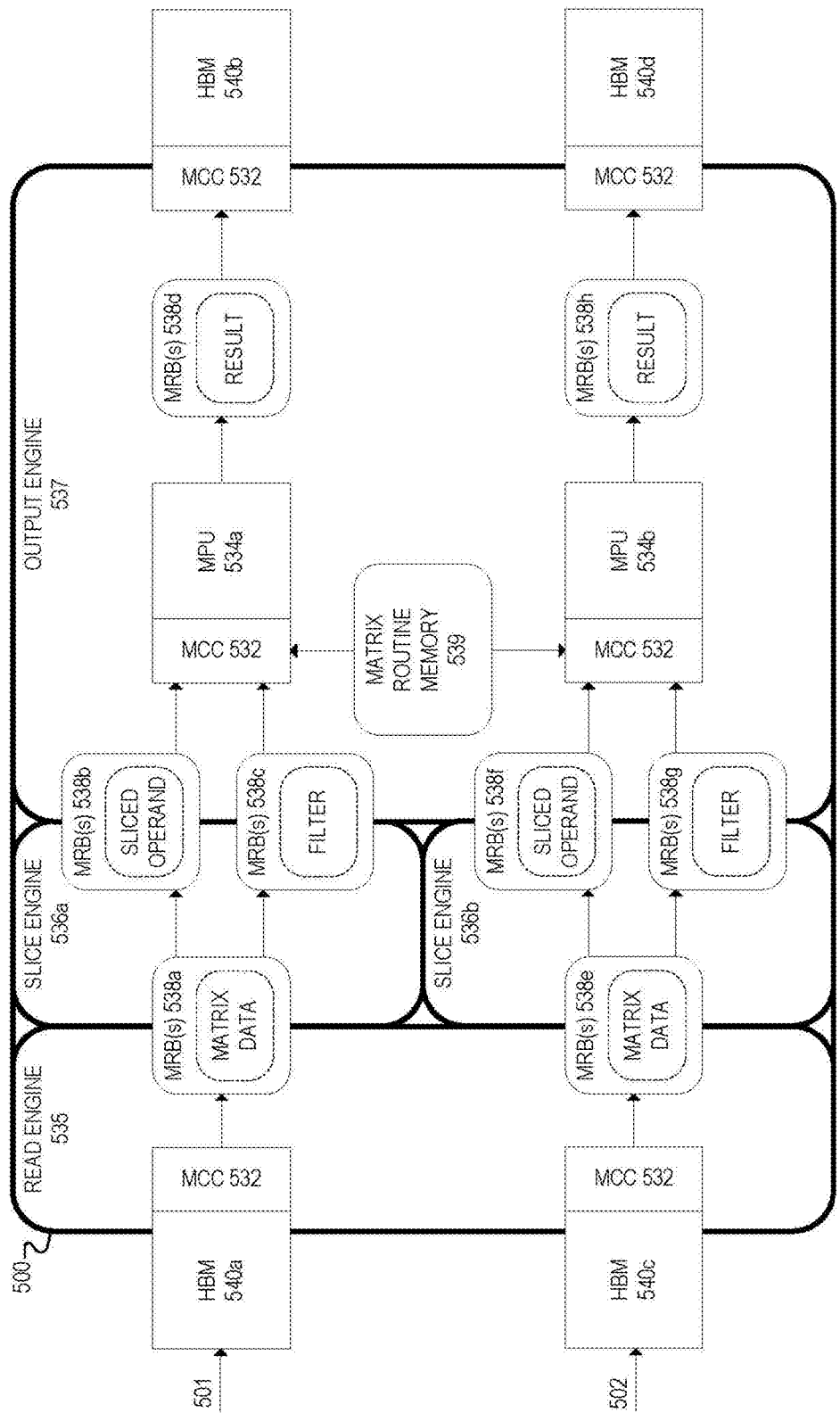
FIG. 5 illustrates an example embodiment of a matrix processing engine.

FIG. 5 illustrates an example embodiment of a matrix processing engine 500. In some embodiments, matrix processing engine 500 may be implemented by a matrix processing architecture, such as the matrix processing architecture of FIGS. 2A-2C. For example, in some embodiments, matrix processing engine 500 may be implemented by a matrix processing cluster on a matrix processing chip (e.g., matrix processing clusters 230 of matrix processing chip 220 from FIGS. 2B and 2C). In those embodiments, a particular matrix processing cluster may use its associated matrix processing engine 500 to perform matrix-based processing and operations, such as partial matrix operations associated with a particular matrix operation distributed across multiple matrix processing resources (e.g., as described throughout this disclosure).

In some embodiments, matrix processing engine 500 may be used to perform operations for an artificial neural network, such as forward propagation, backward propagation, and/or weight update operations. In some cases, for example, matrix processing engine 500 may be used to perform forward propagation and backward propagation for a max pooling layer of an artificial neural network (e.g., as described below in connection with FIGS. 6A-D).

In the illustrated embodiment, matrix processing engine 500 includes read engine 535, slice engines 536, and output engine 537, which are discussed further below. The illustrated embodiment also depicts various components of the underlying matrix processing architecture that may be involved when performing matrix operations using matrix processing engine 500. For example, the illustrated embodiment depicts high bandwidth memory (HBM) modules 540, master control CPU (MCC) 532, matrix processing units (MPUs) 534, and memory resource blocks (MRBs) 538. In the illustrated embodiment, for example, these various components are superimposed on matrix processing engine 500 to illustrate how and when they would be used by matrix processing engine 500, as described further below.

HBM modules 540 may be high bandwidth memory (HBM) modules designed to efficiently store and retrieve large volumes of matrix data. In some embodiments, for example, HBM modules 540 may be high bandwidth memory (HBM) modules on a matrix processing chip (e.g., HBM modules 240 of matrix processing chip 220 from FIG. 2B).

MCC 532 may be a master control CPU (MCC) used to control and/or manage matrix operations. In some embodiments, for example, MCC 532 may be the master control CPU on a particular matrix processing cluster (e.g., MCC 232 of matrix processing cluster 230 from FIG. 2C). In those embodiments, for example, MCC 532 may be used to control and/or manage matrix operations performed on its particular cluster.

MPUs 534 may be matrix processing units (MPUs) used to perform matrix operations. In some embodiments, for example, MPUs 534 may be matrix processing units on a particular matrix processing cluster (e.g., MPUs 234 of matrix processing cluster 230 from FIG. 2C). For example, in some embodiments, a matrix processing cluster may include multiple matrix processing units (MPUs) for performing matrix operations. The illustrated embodiment, for example, depicts two matrix processing units (MPUs) 534a and 534b. In some embodiments, MPUs 534 may perform matrix operations based on commands or instructions from master control CPU (MCC) 532.

Memory resource blocks (MRBs) 538 may be memory components designed to efficiently store and retrieve matrix data. In some embodiments, for example, MRBs 538 may be memory resource blocks on a particular matrix processing cluster (e.g., memory resource blocks 238 of matrix processing cluster 230 from FIG. 2C). In those embodiments, for example, MRBs 538 may be used to store and retrieve matrix data associated with matrix operations performed on the particular cluster.

Matrix processing engine 500 performs matrix operations using read engine 535, slice engines 536, and output engine 537, as described further below. In the illustrated example, matrix processing engine 500 is performing multiple matrix operations 501 and 502 in parallel. For example, as noted above, in some embodiments matrix processing engine 500 may be implemented on a particular matrix processing cluster, and the particular matrix processing cluster may include multiple MPUs 534. In the illustrated example, matrix processing engine 500 is implemented on a cluster with two MPUs 534a-b. Accordingly, matrix processing engine 500 can perform two matrix operations 501 and 502 in parallel using the respective MPUs 534.

The illustrated example shows the control flow of matrix processing engine 500 for matrix operation 501 and matrix operation 502. The control flow for a matrix operation begins with the read engine 535 of matrix processing engine 500. For example, for matrix operation 501, read engine 535 may first retrieve matrix data associated with the particular matrix operation from an HBM module 540a. In the illustrated example, matrix processing engine 500 is being used to perform convolution related operations, and thus the matrix data is associated with the image(s) and filters involved in those operations. In some embodiments, for example, the convolution related operations may be associated with artificial intelligence functionality implemented using operations in an artificial neural network, such as forward propagation, backward propagation, and/or weight update operations.

Read engine 535 may then store the matrix data retrieved from HBM 540a in certain MRBs 538a of its associated cluster. In some embodiments, for example, read engine 535 may use two MRBs 538a to store the associated matrix data. For example, read engine 535 may use one MRB to store matrix data associated with an image, and may use another MRB to store matrix data associated with a filter used for convolution related operations on that image. In some embodiments, read engine 535 may use the master control CPU (MCC) 532 on its respective cluster for storing and retrieving data on HBMs 540 and MRBs 538.

Slice engine 536a may then "slice" the matrix data stored in MRBs 538a to extract the particular matrix operands associated with matrix operation 501. For example, in some cases, the associated matrix operands may only include a subset of the matrix data stored in MRBs 538a, and/or the matrix operands may not be arranged contiguously in the matrix data stored in MRBs 538a. Accordingly, slice engine 536a may extract particular "slices" or pieces of the matrix data stored in MRBs 538a, and may then arrange the slices in a particular manner to form the respective matrix operands.

In the illustrated example, slice engine 536a extracts a sliced matrix operand and a filter from MRBs 538a. For example, as noted above, MRBs 538a may include two MRBs that are respectively used to store image data and filter data. The image data stored in one of the MRBs 538a may be used by slice engine 536a to extract a sliced matrix operand. The sliced matrix operand, for example, may be a particular portion of the image data involved in the convolution related operations. The filter data stored in the other MRB 538a may include a filter involved in the convolution related operations. The sliced operand and the filter, for example, may be the operands for a matrix multiplication operation that is used to multiply the sliced operand with the filter. Slice engine 536a then stores the sliced operand and the filter in respective MRBs. In the illustrated example, the sliced operand is stored in MRB 538b, and the filter is stored in MRB 538c.

Output engine 537 may then be used to compute a result for the particular matrix operation 501. For example, output engine 537 may perform the appropriate matrix operation 501 using the matrix operands generated by slice engine 536a (e.g., the matrix operands stored in MRBs 538b and 538c).

In some embodiments, for example, output engine 537 may first identify an associated matrix routine corresponding to the particular matrix operation, and output engine 537 may then obtain that matrix routine from matrix routine memory 539. Matrix routine memory 539, for example, may be a memory component used to store matrix routines that are used by output engine 537. A matrix routine, for example, may be a programmable routine for a matrix processor that is designed to perform a particular matrix operation when executed by the matrix processor. For example, a matrix routine may include a series of instructions and/or commands, supported by a particular matrix processor, and designed to perform a desired matrix operation when executed by the matrix processor. In some embodiments, for example, a matrix processor may be designed to support a set of instructions and/or commands for performing various fundamental operations. For example, in some embodiments, a matrix processor may support instructions for processing data, performing various arithmetic operations, and/or identifying matrix operands and outputs for the various instructions and operations. In this manner, the fundamental instructions and/or commands supported by the matrix processor can be used to program matrix routines for more complex matrix operations, such as distributed matrix multiplication and/or convolution operations, dimension shuffle operations, reshape operations, and so forth.

After retrieving the appropriate matrix routine, output engine 537 may then specify or supply certain information or fields used by the matrix routine, if appropriate. For example, in some embodiments, certain information and/or fields of a matrix routine may be incomplete or unspecified, such as the size and/or location of the particular operands for the matrix routine. In some embodiments, output engine 537 may use the master control CPU (MCC) 532 on its respective cluster to retrieve matrix routines from matrix routine memory 539, and to specify or supply any remaining information and/or fields for the particular matrix routine (e.g., the size and/or location of matrix operands).

Output engine 537 may then execute the particular matrix routine. For example, output engine 537 may use MCC 532 and/or MPU 534a to execute the programmed instructions associated with the particular matrix routine. MCC 532, for example, may be used to perform certain tasks specified by the instructions, such as reading and writing data, communicating with other resources, and so forth. MPU 534a, for example, may be used to perform particular arithmetic operations specified by the instructions. Moreover, in some cases, a particular matrix routine may be repeatedly executed or looped until the particular operation has been performed or completed for all requisite data (e.g., all data of a particular matrix operand).

Output engine 537 may store the output or result of the matrix routine in certain MRB(s) 538d of the cluster used to execute the matrix routine. Output engine 537 may then perform any remaining processing and/or transmitting of the result 538d. For example, in some cases, output engine 537 may provide the result 538d to other components of the matrix processing architecture. For example, in some cases, matrix operation 501 may be a partial matrix operation associated with a larger matrix operation distributed across multiple processing resources, and thus the result of matrix operation 501 may be a partial result associated with the larger distributed operation. Moreover, the partial result 538d may be needed by other processing resource(s) involved in the distributed matrix operation. Accordingly, output engine 537 may provide the partial result 538d to the appropriate resource, for example, for further processing and/or storage. In some embodiments, output engine 537 may use the master control CPU (MCC) 532 on its respective cluster in order to provide the result of a particular operation to the appropriate destination. In some cases, the appropriate destination resource may vary based on the circumstances, including the type of matrix operation being performed, the implementation of the associated matrix routine(s), the number and availability of processing resources, and so forth. For example, in some cases, the particular processing and/or destination of the output of a matrix operation may be programmed or defined by the associated matrix routine.

In some cases, for example, output engine 537 may provide the result 538d to an HBM 540 for storage, to another processing resource for further processing (e.g., another adjacent cluster or another matrix processing chip), and/or may feed the result 538d back to MPU 534a for further processing and operations. In the illustrated example, the result 538d of matrix operation 501 is transmitted to and stored on HBM 540b.

In the illustrated example, the $2^{nd}$ matrix operation 502 may be executed in parallel with the $1^{st}$ matrix operation 501. Moreover, the control flow for the $2^{nd}$ matrix operation 502 may be similar to the control flow described above for the 1st matrix operation 501. The 2nd matrix operation 502, however, may be a different matrix operation (e.g., performed using a different matrix routine), with different matrix operands and results, using different memory locations of HBMs 540 and/or MRBs 538, and executed using a different MPU 534b and associated slice engine 536b.

Max Pooling in a Matrix Processing Architecture

FIGS. 6A-D illustrate examples of max pooling using a matrix processing engine. An artificial neural network, such as a convolutional neural network, includes a series of connected layers. In some cases, the neural network may include one or more max pooling layers. Max pooling is a down-sampling operation that reduces the spatial size of an input feature map, for example, to reduce the amount of parameters and computation in the neural network. A max pooling layer, for example, is often inserted between successive convolutional layers in a convolutional neural network. Max pooling is performed by sliding a "max filter" throughout the input feature map, identifying the maximum value within each filter position on the input feature map, and storing the respective maximum values in an output feature matrix.

As noted above, max pooling can be implemented as a layer in a neural network. Forward propagation through the max pooling layer of a neural network may be referred to as forward pooling, while backward propagation through the max pooling layer of a neural network may be referred to as backward pooling.

Figure 6A:
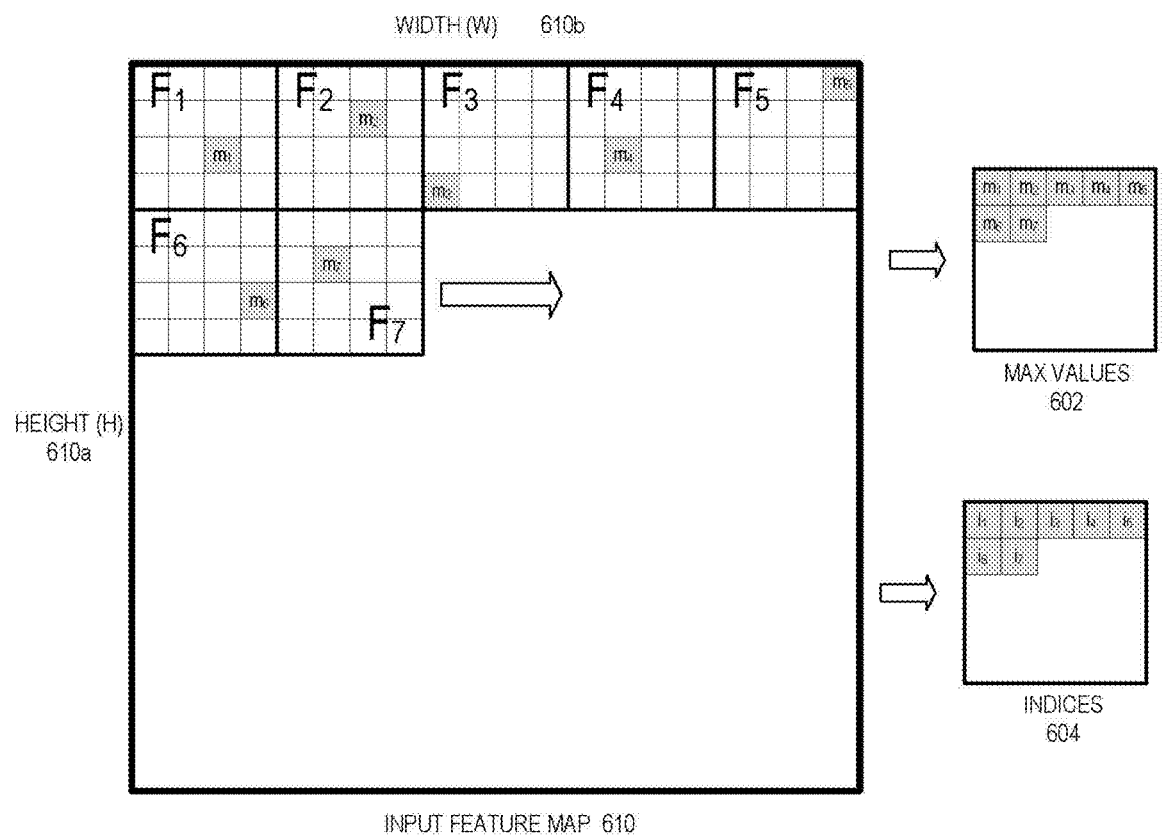
FIGS. 6A-D illustrate examples of max pooling using a matrix processing engine.

FIG. 6A illustrates a simplified example of forward pooling (e.g., performed by matrix processing engine 500 of FIG. 5). The illustrated example performs forward pooling on an input feature map 610 with dimensions H×W (e.g., height H and width W). Moreover, the illustrated example uses a 4×4 filter size with a stride of 4 in both the horizontal and vertical directions. In the illustrated example, the stride and filter size are equal for ease of illustration. In some use cases, however, the stride may not necessarily equal the filter size, which will result in overlapping filter positions during forward pooling.

In the illustrated example, for each filter position (e.g., F1-F7) on the input feature map 610, the maximum value is identified for the elements within the filter, along with its relative position within the bounds of the filter (e.g., the index within the filter that corresponds to the max value). The collective maximum values 602 from each filter position are stored together in memory as an output feature map (OFM), and the collective indices 604 are similarly stored together in memory as an OFM. The max values 602 and indices 604 can also be viewed or treated as a single OFM with two respective channels for the max values and indices.

The illustrated example of FIG. 6A shows forward pooling for the first seven filter positions F1-F7 on the input feature map 610. For example, at filter position F1, the max value m1 is stored in the max values OFM 602, and its corresponding index within the filter i1 is stored in indices OFM 604. Each filter position is processed in a similar manner until all filter positions on the input feature map 610 have been processed, and thus the corresponding max values 602 and indices 604 have been stored in their respective OFMs.

Figure 6B:
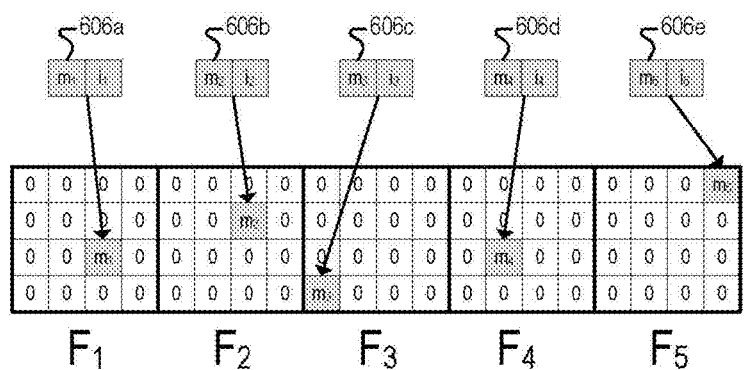

FIG. 6B illustrates a simplified example of backward pooling (e.g., performed by matrix processing engine 500 of FIG. 5). Backward pooling is used to partially reconstruct the original input feature map 610, for example, using the max values 602 and indices 604 from the forward pooling operation. Each max value-index pair (e.g., pairs 606a-e) is processed sequentially to reconstruct a partial facsimile of the original H×W input feature map 610. The reconstructed feature map, of course, will only retain the respective maximum values from the various filter positions, while all other elements will be filled with zeroes.

FIG. 6B illustrates how the original feature map is reconstructed using the max value-index pairs 606. For example, for filter position F1, max value m1 and index i1 are used to write max value m1 to the appropriate location within F1, while all other elements within F1 are filled with zeroes. Each filter position is processed in a similar manner until all max values have been written to their respective locations and the remaining elements of the reconstructed feature map have been filled with zeroes.

As noted above, while the example forward pooling operation from FIG. 6A uses a stride that is equal to the filter size, that may not always be the case. For example, in some use cases, the stride may be different than the filter size, which results in overlapping filter positions during forward pooling. A use case with a stride of 1 is of particular interest, as that is the most restrictive use case. For example, if a stride of 1 was used in the examples of FIGS. 6A and 6B instead of a stride of 4, that would place each successive filter position only 1 element to the right instead of 4 elements to the right. Similarly, after reaching the right edge of the H×W input feature map 610, the next row of filter positions would only be 1 element down instead of 4 elements down.

Accordingly, in the scenario where stride equals 1, there can be a significant overlap of the elements within the various filter positions. Moreover, a particular element of the input feature map 610 could be the maximum value in multiple different filter positions, and thus that element would be identified multiple times by the max value-index pairs generated during forward pooling.

During backward pooling, if each max value-index pair is fully processed and written to memory in isolation, that would require multiple duplicative read and write operations when reconstructing the original feature map, due to the overlapping elements in the respective filter positions. Accordingly, in order to efficiently reconstruct the original feature map, it is critical to determine when you have processed all value-index pairs that can impact a particular element of the reconstructed feature map, so that the particular element can be written to memory at an appropriate time to minimize the number of total memory accesses. For example, given that the filter movement is to the right and then down, the element in the top-left corner of the filter is always the latest element that will have no further updates. Accordingly, that element can be safely written to memory.

Figure 6D:
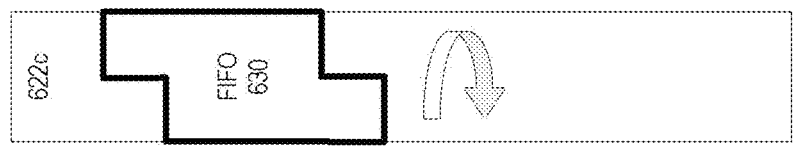
Figure 6C:
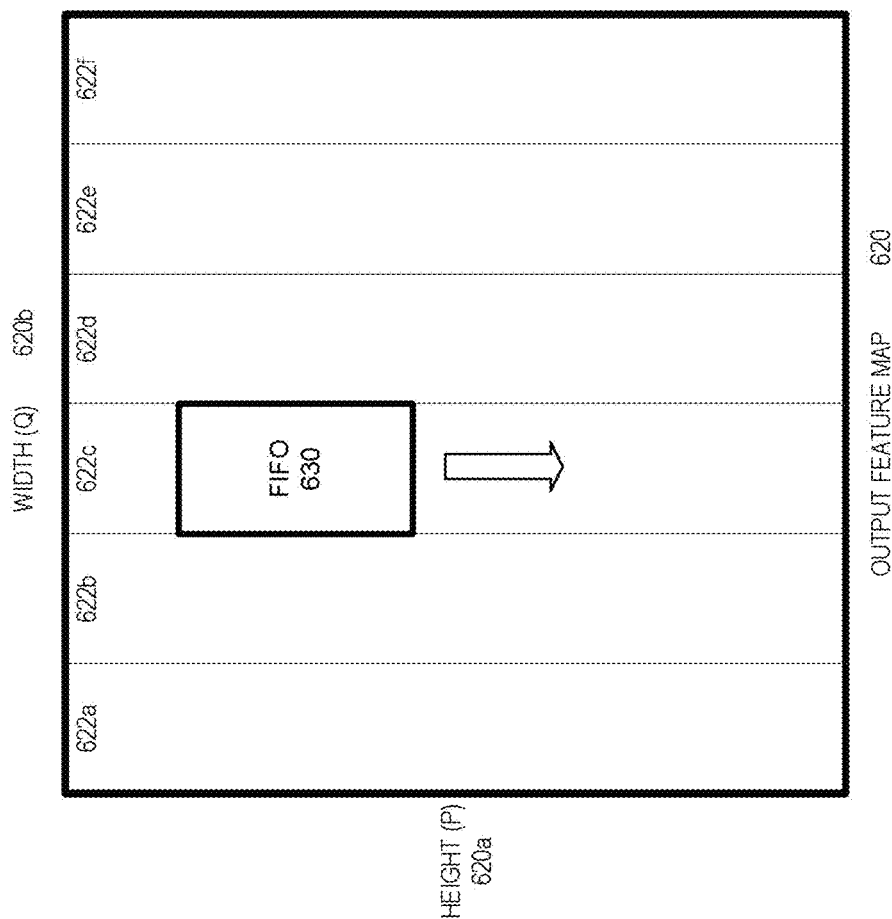

FIGS. 6C-D illustrate a simplified example of an implementation of backward pooling. The illustrated implementation of backward pooling, for example, can be implemented by matrix processing engine 500 of FIG. 5.

As an initial matter, a "macro-column" is a basic construct that can be used by matrix processing engine 500 of FIG. 5, regardless of the particular type of convolutional operation that is being performed. Macro-columns serve to limit the width of the active feature map to ensure that the memory resource blocks (MRBs) have space to hold enough rows of the feature map to execute the particular operation. For backward pooling, the macro-column width may be fixed at a particular size, such as 32 elements. Moreover, there may also be a maximum supported filter size, such as 16×16 elements. Accordingly, in some embodiments, the size of the active feature map may be 16 row elements by 32 column elements, or 512 elements.

FIGS. 6C-D illustrate an implementation of backward pooling that uses a first in first out (FIFO) memory 630, which has the same size as the active feature map (e.g., a 512-entry FIFO). FIFO 630 also maintains a status bit for each entry (e.g., using a flip flop) to track whether each entry has been updated or modified during the backward pooling operation.

During backward pooling, FIFO 630 can effectively be viewed as a sliding window that slides down each macro-column 622 of the output feature map 620. FIG. 6C illustrates a simplified example of FIFO 630 sliding down a particular macro-column 622c of output feature map 620, while FIG. 6D illustrates a more detailed depiction of how FIFO 630 slides down the particular macro-column 622c.

For example, for a stride of 1, FIFO 630 moves a single column element after a particular max value-index pair is processed. The column element that is uncovered by moving FIFO 630 can then be written to memory, as that column element will not be modified by any subsequently processed max value-index pairs. For a stride greater than 1, multiple column elements will be uncovered when moving FIFO 630. In general, after processing a particular max value-index pair, the number of column elements written to memory is equal to the column stride, as the column stride dictates how many column elements are uncovered each time FIFO 630 is moved.

When reaching the boundary of a macro-column 622c, FIFO 630 is then moved down a number of rows equal to the row stride. If the row stride is greater than 1, then entire rows are uncovered by the movement of FIFO 630, all of which are immediately written to memory. The particular number of rows written to memory is the row stride minus one (e.g., row stride−1).

Moreover, when writing a particular element to memory, the corresponding status bit of FIFO 630 can be used to determine whether the element has been modified. For example, if the element has not been modified, then a 0 may simply be written to memory. If the status bit indicates that the element has been modified, however, then a read-modify-write operation may be performed to read the existing value, modify the existing value (e.g., by summing the existing value with the new value), and then writing the modified value back to memory.

Each macro-column can be processed in this manner until the backward pooling operation is complete. Moreover, in some embodiments, the result of the backward pooling operation may be written to one or more memory resource blocks (MRBs).

Figure 7:
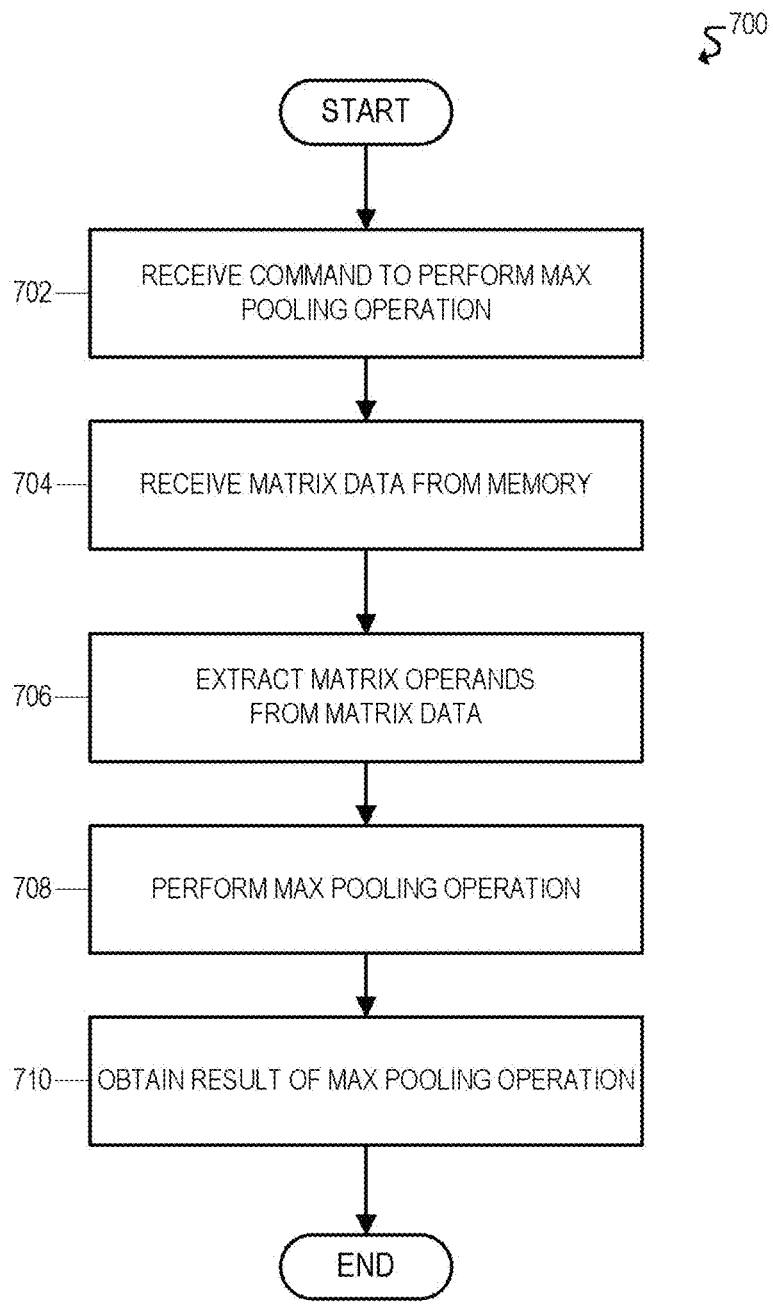
FIG. 7 illustrates a flowchart for an example embodiment of max pooling using a matrix processing engine.

FIG. 7 illustrates a flowchart 700 for an example embodiment of max pooling using a matrix processing engine. Flowchart 700 may be implemented, in some embodiments, by components described throughout this disclosure (e.g., the matrix processing architecture of FIGS. 2A-C and/or the matrix processing engine of FIG. 5).

The flowchart may begin at block 702 by receiving a command to perform a max pooling operation. The max pooling operation, for example, may be associated with forward or backward propagation in a neural network. For example, during forward propagation in a neural network, the max pooling operation may be a forward pooling operation used to reduce the size of a matrix operand. During backward propagation in a neural network, the max pooling operation may be a backward pooling operation used to reconstruct the original matrix operand from the forward pooling operation.

The flowchart may then proceed to block 704 to obtain matrix data from memory. In some embodiments, for example, matrix data associated with the one or more operands of the max pooling operation may be retrieved from memory. Moreover, in some embodiments, the memory may be a multi-dimensional memory.

The flowchart may then proceed to block 706 to obtain the matrix operands from the matrix data. For example, in some embodiments, the matrix data may be sliced to extract the matrix operands.

The flowchart may then proceed to block 708 to perform the max pooling operation using the matrix operands obtained from the matrix data. For example, for a backward pooling operation, the original matrix operand from a forward pooling operation is partially reconstructed using a max value matrix. The max value matrix, for example, may be the output from the forward pooling operation. In order to reconstruct the original matrix operand, each max value entry in the max value matrix may be processed. Each max value entry, for example, may include a maximum value and an index. A portion of the original matrix is reconstructed using each max value entry. After using a particular max value entry to reconstruct a portion of the original matrix, it is then determined that certain element(s) of the partially reconstructed matrix will not be modified further during the remainder of the reconstruction process. Accordingly, those elements are written to memory. In some embodiments, the elements of the reconstructed matrix may be stored using a FIFO memory. Moreover, the FIFO memory may include status bits (e.g., implemented using flip flops) to track whether the respective entries in the FIFO memory have been modified.

After each max value entry has been processed, the flowchart may then proceed to block 710 to obtain a result of the max pooling operation. For example, for a backward pooling operation, the result may be a matrix that is reconstructed from the respective max value entries, as described above.

At this point, the flowchart may be complete. In some embodiments, however, the flowchart may restart and/or certain blocks may be repeated. For example, in some embodiments, the flowchart may restart at block 702 to continue performing max pooling operations.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also matrix processors, graphics processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLE IMPLEMENTATIONS

The following examples pertain to embodiments described throughout this disclosure.

One or more embodiments may include an apparatus, comprising: a multi-dimensional memory; a plurality of processing elements to perform a matrix operation, wherein the matrix operation comprises a max pooling operation on one or more matrix operands, and wherein the plurality of processing elements comprises one or more matrix processors; wherein the plurality of processing elements is configured to: receive matrix data from the multi-dimensional memory, wherein the matrix data is associated with the one or more matrix operands; extract the one or more matrix operands from the matrix data; perform the max pooling operation using the one or more matrix operands; and obtain a result of the max pooling operation.

In one example embodiment of an apparatus, the max pooling operation comprises an operation to reduce a size of a matrix operand.

In one example embodiment of an apparatus, the max pooling operation comprises a forward pooling operation.

In one example embodiment of an apparatus, the max pooling operation comprises a backward pooling operation.

In one example embodiment of an apparatus, the backward pooling operation comprises an operation to create a reconstructed matrix by partially reconstructing an original matrix using a max value matrix.

In one example embodiment of an apparatus, the plurality of processing elements is further configured to: identify a max value entry from the max value matrix; create a partial matrix based on the max value entry, wherein the partial matrix comprises a portion of the reconstructed matrix; determine that one or more elements of the partial matrix will not be modified; and write the one or more elements of the partial matrix to memory.

In one example embodiment of an apparatus, the max value entry comprises a maximum value and an index.

In one example embodiment of an apparatus, the apparatus further comprises a FIFO memory to store one or more elements of the reconstructed matrix.

In one example embodiment of an apparatus, the FIFO memory comprises one or more status bits to track whether one or more entries in the FIFO memory have been modified.

In one example embodiment of an apparatus, the max value matrix is an output of a forward pooling operation.

In one example embodiment of an apparatus, the max value matrix comprises one or more value-index pairs, wherein the one or more value-index pairs each comprise a maximum value and an index.

In one example embodiment of an apparatus, the max pooling operation is associated with a forward propagation operation in a neural network.

In one example embodiment of an apparatus, the max pooling operation is associated with a backward propagation operation in a neural network.

One or more embodiments may include a method, comprising: performing a matrix operation, wherein the matrix operation comprises a max pooling operation on one or more matrix operands, wherein performing the matrix operation comprises: receiving matrix data from a multi-dimensional memory, wherein the matrix data is associated with the one or more matrix operands; extracting the one or more matrix operands from the matrix data; performing the max pooling operation using the one or more matrix operands; and obtaining a result of the max pooling operation.

In one example embodiment of a method, the max pooling operation comprises a forward pooling operation to reduce a size of a matrix operand.

In one example embodiment of a method: the max pooling operation comprises a backward pooling operation; and the backward pooling operation comprises an operation to create a reconstructed matrix by partially reconstructing an original matrix using a max value matrix.

In one example embodiment of a method, the method further comprises: identifying a max value entry from the max value matrix; creating a partial matrix based on the max value entry, wherein the partial matrix comprises a portion of the reconstructed matrix; determining that one or more elements of the partial matrix will not be modified; and writing the one or more elements of the partial matrix to memory.

In one example embodiment of a method, the max value entry comprises a maximum value and an index.

In one example embodiment of a method, the method further comprises storing one or more elements of the reconstructed matrix in a FIFO memory.

In one example embodiment of a method, the FIFO memory comprises one or more status bits to track whether one or more entries in the FIFO memory have been modified.

In one example embodiment of a method, the max value matrix is an output of a forward pooling operation.

One or more embodiments may include an apparatus comprising means to perform a method from any of the preceding examples.

One or more embodiments may include at least one machine accessible storage medium having instructions stored thereon, the instructions when executed on a machine, cause the machine to perform a method or realize an apparatus from any of the preceding examples.

One or more embodiments may include a system, comprising: a plurality of memory elements, wherein the plurality of memory elements comprises a multi-dimensional memory; and a plurality of processing elements to perform a matrix operation, wherein the matrix operation comprises a max pooling operation on one or more matrix operands, wherein the plurality of processing elements comprises: a host processor; and one or more matrix processing chips; wherein the plurality of processing elements is configured to: receive matrix data from the multi-dimensional memory, wherein the matrix data is associated with the one or more matrix operands; extract the one or more matrix operands from the matrix data; perform the max pooling operation using the one or more matrix operands; and obtain a result of the max pooling operation.

In one example embodiment of a system, each matrix processing chip comprises a plurality of matrix processing clusters.

In one example embodiment of a system, each matrix processing cluster comprises a plurality of matrix processing units.

In one example embodiment of a system, each matrix processing cluster comprises a plurality of memory resource blocks.

One or more embodiments may include at least one machine accessible storage medium having instructions stored thereon, the instructions, when executed on a machine, cause the machine to: perform a matrix operation, wherein the matrix operation comprises a max pooling operation on one or more matrix operands, and wherein the instructions that cause the machine to perform the matrix operation further cause the machine to: receive matrix data from a multi-dimensional memory, wherein the matrix data is associated with the one or more matrix operands; extract the one or more matrix operands from the matrix data; perform the max pooling operation using the one or more matrix operands; and obtain a result of the max pooling operation.

In one example embodiment of a storage medium: the max pooling operation comprises a backward pooling operation; and the backward pooling operation comprises an operation to create a reconstructed matrix by partially reconstructing an original matrix using a max value matrix.

In one example embodiment of a storage medium, the instructions further cause the machine to: identify a max value entry from the max value matrix; create a partial matrix based on the max value entry, wherein the partial matrix comprises a portion of the reconstructed matrix; determine that one or more elements of the partial matrix will not be modified; and write the one or more elements of the partial matrix to memory.

In one example embodiment of a storage medium, the instructions further cause the machine to store one or more elements of the reconstructed matrix in a FIFO memory, wherein the FIFO memory comprises one or more status bits to track whether one or more entries in the FIFO memory have been modified.

What is claimed is:

1. An apparatus, comprising:
a multi-dimensional memory;
a plurality of processing elements to perform a matrix operation, wherein:
the plurality of processing elements comprises one or more matrix processors; and
the matrix operation comprises a backward pooling operation on one or more matrix operands, wherein the one or more matrix operands comprise a max value matrix associated with an original matrix, and wherein the backward pooling operation comprises
an operation to create a reconstructed matrix by partially reconstructing the original matrix using the max value matrix;
wherein the plurality of processing elements is configured to:
receive matrix data from the multi-dimensional memory, wherein the matrix data is associated with the one or more matrix operands;
extract the one or more matrix operands from the matrix data;
perform the backward pooling operation using the one or more matrix operands, wherein the plurality of processing elements configured to perform the backward pooling operation is further configured to:
identify a max value entry from the max value matrix;
create a partial matrix based on the max value entry, wherein the partial matrix comprises a portion of the reconstructed matrix;
determine that one or more elements of the partial matrix will not be modified; and
write the one or more elements of the partial matrix to the multi-dimensional memory; and
obtain a result of the backward pooling operation.

2. The apparatus of claim 1, wherein the plurality of processing elements is further configured to perform a forward pooling operation.

3. The apparatus of claim 2, wherein the forward pooling operation is associated with a forward propagation operation in a neural network.

4. The apparatus of claim 2, wherein the forward pooling operation comprises an operation to reduce a size of a matrix operand.

5. The apparatus of claim 1, wherein the max value entry comprises a maximum value and an index.

6. The apparatus of claim 1, further comprising a FIFO memory to store one or more elements of the reconstructed matrix.

7. The apparatus of claim 6, wherein the FIFO memory comprises one or more status bits to track whether one or more entries in the FIFO memory have been modified.

8. The apparatus of claim 1, wherein the max value matrix is an output of a forward pooling operation.

9. The apparatus of claim 1, wherein the max value matrix comprises one or more value-index pairs, wherein the one or more value-index pairs each comprise a maximum value and an index.

10. The apparatus of claim 1, wherein the backward pooling operation is associated with a backward propagation operation in a neural network.

11. A method, comprising:
performing a matrix operation, wherein the matrix operation comprises a backward pooling operation on one or more matrix operands, wherein the one or more matrix operands comprise a max value matrix associated with an original matrix, wherein the backward pooling operation comprises an operation to create a reconstructed matrix by partially reconstructing the original matrix using the max value matrix, and wherein performing the matrix operation comprises:
receiving matrix data from a multi-dimensional memory, wherein the matrix data is associated with the one or more matrix operands;
extracting the one or more matrix operands from the matrix data;

performing the backward pooling operation using the one or more matrix operands, wherein performing the backward pooling operation comprises:
  identifying a max value entry from the max value matrix;
  creating a partial matrix based on the max value entry, wherein the partial matrix comprises a portion of the reconstructed matrix;
  determining that one or more elements of the partial matrix will not be modified; and
  writing the one or more elements of the partial matrix to the multi-dimensional memory; and
obtaining a result of the backward pooling operation.

12. The method of claim 11, further comprising storing one or more elements of the reconstructed matrix in a FIFO memory, wherein the FIFO memory comprises one or more status bits to track whether one or more entries in the FIFO memory have been modified.

13. A system, comprising:
  a plurality of memory elements, wherein the plurality of memory elements comprises a multi-dimensional memory; and
  a plurality of processing elements to perform a matrix operation, wherein:
    the plurality of processing elements comprises a host processor and one or more matrix processing chips; and
    the matrix operation comprises a backward pooling operation on one or more matrix operands, wherein the one or more matrix operands comprise a max value matrix associated with an original matrix, and wherein the backward pooling operation comprises an operation to create a reconstructed matrix by partially reconstructing the original matrix using the max value matrix;
  wherein the plurality of processing elements is configured to:
    receive matrix data from the multi-dimensional memory, wherein the matrix data is associated with the one or more matrix operands;
    extract the one or more matrix operands from the matrix data;
    perform the backward pooling operation using the one or more matrix operands, wherein the plurality of processing elements configured to perform the backward pooling operation is further configured to:
      identify a max value entry from the max value matrix;
      create a partial matrix based on the max value entry, wherein the partial matrix comprises a portion of the reconstructed matrix;
      determine that one or more elements of the partial matrix will not be modified; and
      write the one or more elements of the partial matrix to the plurality of memory elements; and
    obtain a result of the backward pooling operation.

14. The system of claim 13, wherein each matrix processing chip comprises a plurality of matrix processing clusters.

15. The system of claim 14, wherein each matrix processing cluster comprises a plurality of matrix processing units.

16. The system of claim 14, wherein each matrix processing cluster comprises a plurality of memory resource blocks.

17. At least one non-transitory machine accessible storage medium having instructions stored thereon, the instructions, when executed on a machine, cause the machine to:
  perform a matrix operation, wherein the matrix operation comprises a backward pooling operation on one or more matrix operands, wherein the one or more matrix operands comprise a max value matrix associated with an original matrix, wherein the backward pooling operation comprises an operation to create a reconstructed matrix by partially reconstructing the original matrix using the max value matrix, and wherein the instructions that cause the machine to perform the matrix operation further cause the machine to:
    receive matrix data from a multi-dimensional memory, wherein the matrix data is associated with the one or more matrix operands;
    extract the one or more matrix operands from the matrix data;
    perform the backward pooling operation using the one or more matrix operands, wherein the instructions that cause the machine to perform the backward pooling operation further cause the machine to:
      identify a max value entry from the max value matrix;
      create a partial matrix based on the max value entry, wherein the partial matrix comprises a portion of the reconstructed matrix;
      determine that one or more elements of the partial matrix will not be modified; and
      write the one or more elements of the partial matrix to the multi-dimensional memory; and
    obtain a result of the backward pooling operation.

18. The storage medium of claim 17, wherein the instructions further cause the machine to store one or more elements of the reconstructed matrix in a FIFO memory, wherein the FIFO memory comprises one or more status bits to track whether one or more entries in the FIFO memory have been modified.

* * * * *